United States Patent [19]

Bergquist

[11] 4,157,786

[45] Jun. 12, 1979

[54] THERMOSTATIC GAS VALVE

[75] Inventor: Frank H. Bergquist, Clarendon Hills, Ill.

[73] Assignee: Harper-Wyman Company, Hinsdale, Ill.

[21] Appl. No.: 801,923

[22] Filed: May 31, 1977

[51] Int. Cl.² ............................ F16K 35/00; F23N 5/02
[52] U.S. Cl. ..................................... 236/15 A; 251/96
[58] Field of Search ............... 236/15 A, 99 R, 99 G; 251/96; 74/504

[56] References Cited

U.S. PATENT DOCUMENTS

| | | | |
|---|---|---|---|
| 2,194,714 | 5/1940 | Mueller | 251/96 X |
| 2,680,383 | 6/1954 | Lahti | 74/528 |
| 2,849,891 | 9/1958 | Mills | 74/504 |
| 2,972,262 | 2/1961 | Kunzler | 74/504 |
| 3,010,693 | 11/1961 | Lamar | 251/96 |
| 3,011,720 | 12/1961 | Ives | 251/96 X |
| 3,071,341 | 1/1963 | Wantz et al. | 251/96 |
| 3,764,102 | 10/1973 | Shopsky | 251/96 |
| 3,979,103 | 9/1976 | Branson et al. | 236/15 A |

Primary Examiner—William E. Wayner
Attorney, Agent, or Firm—Mason, Kolehmainen, Rathburn & Wyss

[57] ABSTRACT

A thermostatic gas valve includes a thermostatic valve for regulating the temperature of a burner and a manually operable valve for regulating the flame height. The operation of the manual and thermostatic valves is controlled by a stem. The valve includes a shaft coupled to the stem that is axially movable from an off position to a first position. In the first position the shaft is rotated to rotate the manual valve. The shaft may then be axially moved to a second position and rotated to rotate the thermostatic valve to the desired position. The shaft is locked in a first non-rotatable position and prevented from being axially moved by a locking element.

11 Claims, 10 Drawing Figures

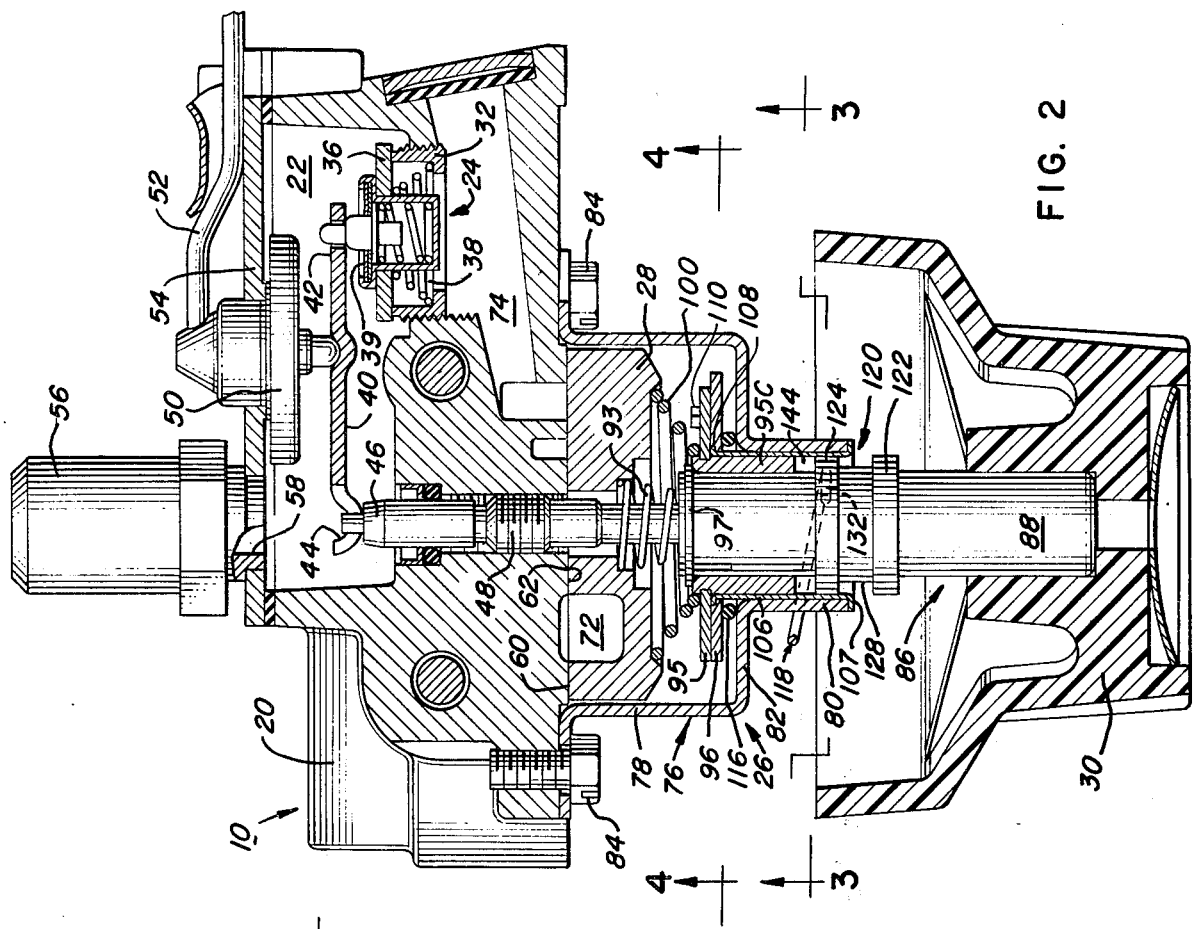

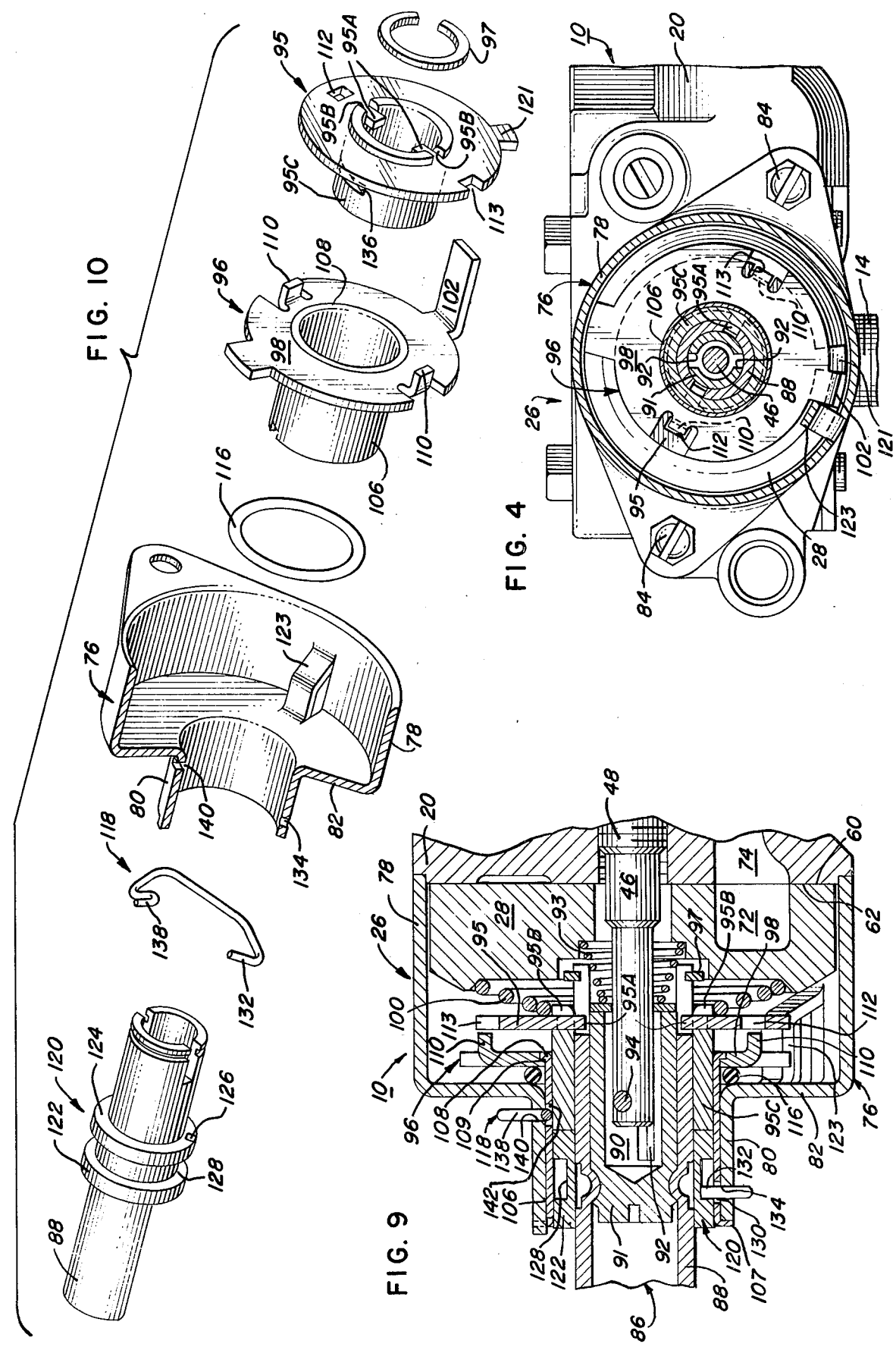

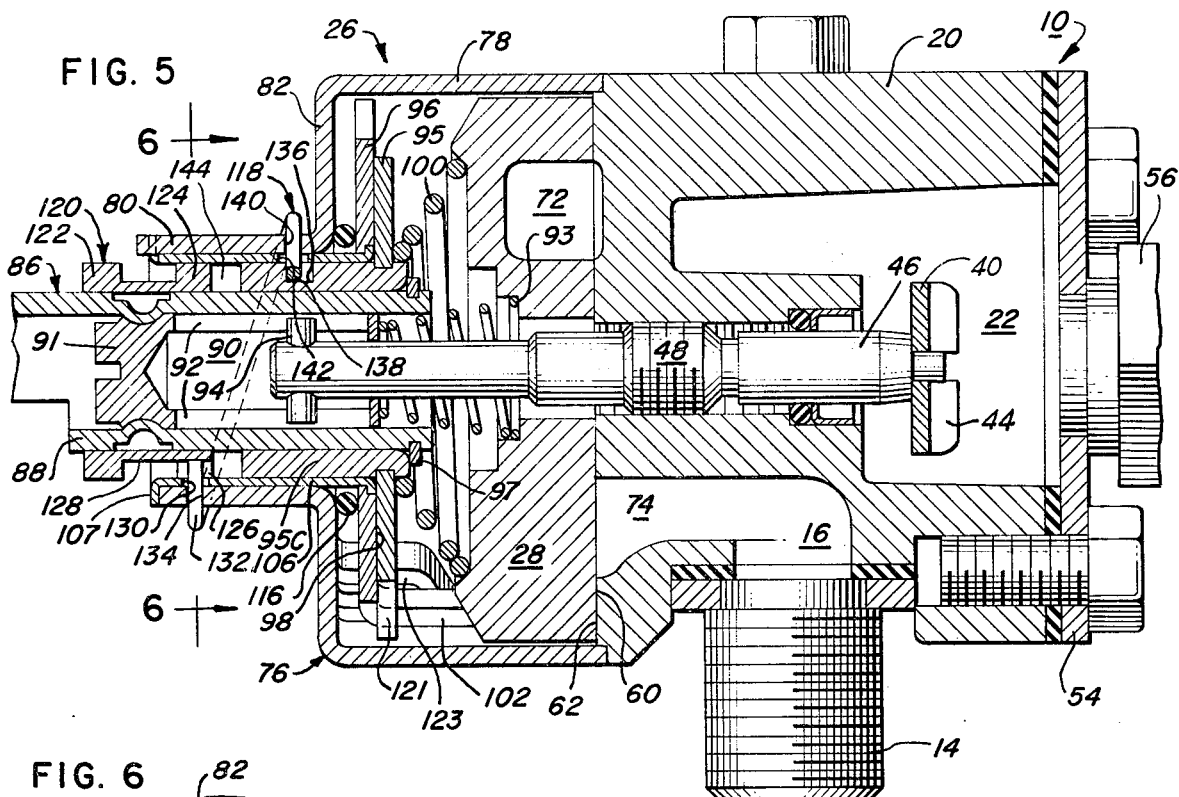
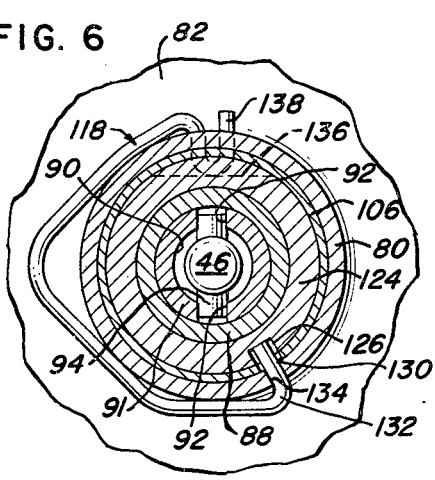
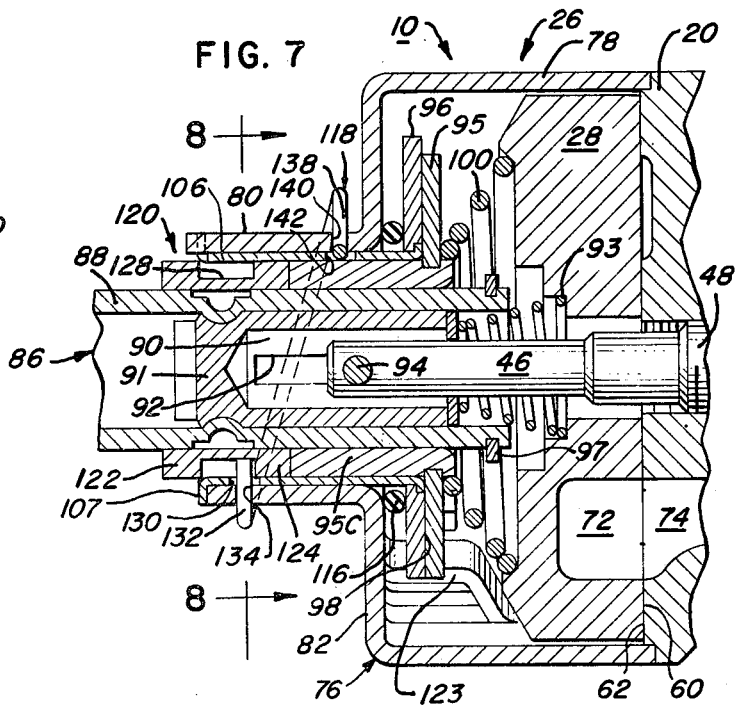
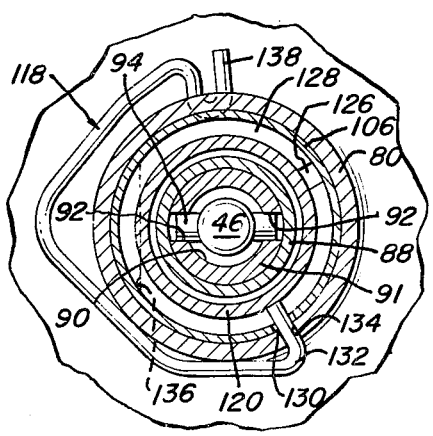

THERMOSTATIC GAS VALVE

BACKGROUND OF THE INVENTION

A. Field of the Invention

The present invention relates to a thermostatic gas valve including a locking element for locking the valve in the off position and for defining first and second positions of the valve for adjusting the flame height and temperature, respectively, of a gas burner.

B. Description of the Prior Art

Modern gas stoves often include at least one burner that may be controlled as to temperature and height of the flame. In this manner, the operator of the burner may ensure proper cooking of foods.

The valve employed to control the burner typically includes a thermostatically actuable valve that senses the temperature of a pan or similar article placed upon the burner and controls the flame to maintain the temperature selected. The gas valve also includes a rotary valve disc that may be rotated to control the maximum height attained by the flame when the thermostatically controlled valve is fully opened.

Both the thermostatic valve and the rotary disc are actuated by a valve shaft and stem mounted within the housing of the gas valve. The sleeve may be axially moved within the housing from an off position to a first position whereupon the sleeve and stem may be rotated to actuate the rotary disc to select the desired flame height. Thereafter, the shaft and stem may again be axially moved to a second position whereupon the shaft and stem may be rotated to actuate the thermostatic valve thereby selecting the desired temperature.

An example of a typical prior art valve of this type is disclosed in U.S. Pat. No. 3,030,025 assigned to the assignee of the present invention and incorporated by reference herein.

In recent years regulating authorities governing the manufacturing of thermostatic gas valves have been considering, and in some cases implementing, regulations requiring the valve to be locked in the off position. In addition, it has been considered desirable from a marketing standpoint to include definite positions of the thermostatic valve such that the shaft and stem of the valve may be axially moved from the off position to a first position and must then be rotated to the selected flame height before the shaft and stem may be axially moved to a second position. This provides the operator with definite positions acknowledging the operations that must be performed. It would be desirable to meet these requirements without substantial modification of the existing structure of thermostatic gas valves.

SUMMARY OF THE INVENTION

An object of the present invention is to provide a new and improved thermostatic gas valve operable to control the flame height of a gas burner and the temperature developed thereby.

A further object of the present invention is to provide a device that may be included in a thermostatic gas valve without substantial modification of the structure of the valve to lock the valve in the off position and to define first, gas flame height position and a second, temperature regulating position.

Briefly, the present invention is directed to a thermostatic gas valve that includes a thermostatically actuated valve that is coupled to a gas burner to control the temperature developed by the flame. The gas valve also includes a rotor valve disc that may be rotated to control the height of the flame.

The actuation of the rotor disc and thermostatic valve is controlled by a shaft and stem rotatably mounted within the valve. A knob is coupled to the shaft that, in turn, is slideably mounted within the valve. The shaft is secured to the stem to allow sliding movement of the shaft relative to the stem and to allow conjoint rotation.

A locking member is included to lock the valve in the off position and to define first and second axial positions of the valve shaft and stem. The locking element includes a first portion that is positioned within a groove defined in the shaft in the valve off position. The first portion of the locking device is moved out of the groove upon axial movement of the shaft from the off position to a first position. Once in the first position, the first portion is out of the groove allowing rotation of the shaft and the stem to select a desired flame height.

The locking device includes a second portion that is mounted within an arcuate groove also defined on the shaft. This portion prevents movement of the stem and shaft from the off position through the first position to the second position without rotation of the stem in the first position. Upon rotation of the stem and shaft in the first position, the second portion of the locking device is rotated out of the annular groove. Thereafter, the shaft and stem may be axially moved to the second position and rotated to set the desired temperature.

DESCRIPTION OF THE DRAWINGS

The present invention together with the above and other objects and advantages will best appear from the following detailed description of an illustrative embodiment of the invention shown in the accompanying drawings, wherein:

FIG. 1 is a front elevational view of a thermostatic gas valve constructed in accordance with the principles of the present invention;

FIG. 2 is an enlarged, cross-sectional view of the valve taken along line 2—2 of FIg. 1;

FIG. 3 is a view taken along line 3—3 of FIG. 2;

FIG. 4 is a view taken along line 4—4 of FIG. 2;

FIG. 5 is a view taken along line 5—5 of FIG. 3;

FIG. 6 is a view taken along line 6—6 of FIG. 5;

FIG. 7 is a fragmentary, cross-sectional view of the gas valve in the position for adjusting the flame height;

FIG. 8 is a view taken along line 8—8 of FIG. 7;

FIG. 9 is a view similar to FIG. 7 with the valve in the position for setting the temperature; and FIG. 10 is an enlarged, exploded view of a portion of the gas valve.

DETAILED DESCRIPTION OF A PREFERRED EMBODIMENT

Referring now to the drawings, and first, primarily, to FIGS. 1-5, the valve of the present invention is indicated as a whole by a reference character 10. It is adapted to be mounted upon and be supplied with gas from a gas supply manifold, the mounting being effected by an externally threaded dependent nipple 14, within which is a gas inlet passageway 16.

The valve includes, in the main, a valve body 20, within which is a chamber 22 (see FIG. 2) in which is mounted a thermostatically actuated regulating valve indicated as a whole by reference character 24. The valve 24 controls the flow of gas from a manually operable valve 26 that includes a rotary valve element shown to be a rotor valve disc 28. The disc 28 is adapted to be adjusted by a handle 30, that is also utilized to select the temperature to be maintained. These valves and the operating means therefore may take various forms, that illustrated being of the type disclosed and claimed in U.S. Pat. No. 3,030,025 assigned to the assignee of this application. Accordingly, the valve will not be described in detail but only sufficiently to provide a better understanding of the present invention; the present invention being improved locking means for preventing rotation of the rotary valve element 28 in the off position and for defining flame and temperature selection positions.

The thermostatic valve 24 includes a relatively stationary valve seat 32. The valve 24 also includes a movable valve member 36 biased away from the valve seat by a spring 38 and the position of which is varied by thermostatic actuating means. More specifically, the position is varied by a bimetallic washer 39. The valve 24 is adjusted by a lever 40 having one end 42 operatively associated with valve 36 and its other end 44 operatively associated with a rotatable axially movable shaft 46. Shaft 46 includes an intermediate threaded section 48 that is movable by the valve handle 30 to vary the temperature to be maintained by the valve 10. The position of the lever 40 and, thus, of the valve member 36 is controlled by a thermostatically actuated power device 50 that may be of the diaphragm type. The device 50 is connected by a capillary tube 52 to a suitable sensing unit (not shown) that may include a thermostatic capsule maintained in contact with the bottom of a cooking vessel placed upon a burner to which the flow of gas is controlled by the valve 10. For convenience, the thermostatic motor 50 may be mounted upon an end plate 54 closing the recess 22. The plate 54 also supports an outlet hood 56 communicating with a gas outlet passageway 58 through which gas flows to the burner in the conventional manner.

The flow of gas to the thermostatic valve 24 is controlled by the manually operable rotatable rotor disc 28. Disc 28 has a planar face 60 abutting against a planar face 62 formed on the valve body 20. The body 20 and disc 28 may be provided with suitable passageways interconnecting the inlet passageway 16 and the recess 22 via the thermostatically operated regulating valve 24. The passageways may be such that they enable the valve disc 28 to be moved between the off and full on positions to provide a manually regulated flow of gas to the burner as between a low flame setting 64 and a high flame setting 66 indicated on the valve handle 30 (FIG. 1) in cooperation with an indicating line 68 on a bezel 70 associated with the valve handle 30. The off position is indicated by a radial boss 71 on the handle when it is under the line 68.

If the valve 10 is moved to an intermediate position to provide an intermediate height flame, the disc 28 is moved to a position such that a rotor passageway 72 is aligned with a passageway 74. In this position gas flows from the inlet passageway 16 to rotor passageway 72 and to passageway 74 in the valve body 28 leading to the thermostatic valve 24, and hence, to the recess 22.

The rotor valve disc 28 is mounted in a housing or casing 76 having a larger diameter inner portion 78 and a smaller diameter axially extending portion 80 that are interconnected by a front wall 82 spaced some distance forward of the rotor 28. The casing 76 is secured to the valve body 20 by suitable means such as screw bolts 84.

The valve handle 30 is connected to the rotor valve disc 28 through selectively operable clutch means whereby the handle 30 may be disengaged from the rotor disc 28 as described and claimed in U.S. Pat. No. 3,030,026. The connection is effected through a rotatable and axially movable stem assembly indicated as a whole by reference character 86. The assembly 86 includes a valve stem or shaft 88 including an outer portion upon which the handle 30 is secured. There is also a hollow inner portion 90 (FIG. 5) defined by an insert 91 that includes axial slots 92 therein. The insert 91 is press fit inside stem 88 and maintained therein by a spring 93. The slots 92 are connected to the thermostatic valve regulating shaft 46 by a pin 94 mounted at the outer end of the shaft 46 and extending outwardly into the axial slots 92. The stem assembly 86 includes also a drive washer 95 held on the stem 88 by a split ring 97 and fixed to the stem assembly 86 by extensions 95A (FIG. 10) secured in slots 95B defined on a first sleeve 95C that encircles and is secured to the stem 88.

The drive washer 95 is adapted selectively to be connected to the rotor disc valve 28 through a drive yoke indicated as a whole by reference character 96. The yoke 96 includes a central portion 98 against the inside of which the drive washer 95 normally abuts being biased by a spring 100. Spring 100 also serves to hold the valve disc 28 seated against the valve body 20. The drive yoke 96 includes an axially extending drive finger 102 (FIG. 10) extending into recesses (not shown) in the valve disc 28 whereby the two are maintained in driving relation.

In accordance with the present invention, the drive yoke 96 is rotatably mounted in the housing 76 upon a tubular sleeve or bearing element 106 fixedly secured within the smaller diameter forward extension 80 of the housing. The tube 106 has opposed outwardly extending front and rear flanges 107 and 108, the former of which abuts against the front end of housing part 80 and the latter of which abuts against a shoulder 109 provided by counterboring at the region of the central opening in the drive yoke 96.

In the position shown in FIG. 5, the stem assembly 86 and valve handle 30 are drivingly connected to the valve disc 28 through the drive washer 95 and drive yoke 96 through engaged clutch means constituted by spaced axial forwardly extending projections 110 (FIG. 10) on the drive yoke 96 and a corresponding aperture 112 and slot 113 on the drive washer 95. To decouple, or to disengage the drive washer 95 from the drive yoke 96, the valve handle 30 and stem assembly 86 are moved inwardly against the force of spring 100, thereby to disengage drive projections 110 on the drive yoke 96 from the washer 95 as shown in FIG. 9. After such disengagement, the valve handle 30 and the stem assembly 86 can be turned independently of the rotor disc valve 28 so that rotation of the handle 30 turns only the shaft 46 to adjust the temperature setting of the valve 10.

Braking means are provided to prevent rotation of the valve disc 28 when the stem assembly 86 is uncoupled from it and rotated for temperature adjustment. This braking means is frictional in nature and acts upon the drive yoke 96 as will be brought out in the following description.

It will be noted that there is interposed between the front wall 82 of the housing and the adjacent central portion 98 of the drive yoke 96 a generally circular spring 116 encircling the tubular bearing 106 and applying an axial force against the drive yoke 96. The spring 116 prior to assembly in the valve 10 has a generally concave-convex shape. When assembled, it is held in substantially a single plane whereby it exerts a frictional force on the drive yoke 96. This force brakes the drive yoke 96 when the latter is declutched from the drive washer as it is in the position of FIG. 9. The result is that the rotor valve disc 28 is effectively held in selected position while the thermostatic setting of the valve is adjusted.

The valve 10 includes a safety feature that locks the valve in the off position (FIGS. 5 and 6). Axial movement of the knob 30 to a first position is necessary to unlock the valve 10 and to allow rotation of the stem assembly 86 to select the desired flame height. Axial movement of the knob 30 to a second position after the flame height is selected is required before rotation of the knob 30 may be effected to select the desired temperature.

The definition of the locking, first and second positions is provided by a locking element generally designated by the reference number 118 that acts in conjunction with the stem assembly 86 and the first sleeve 95C. More specifically, the stem assembly 86 includes a second sleeve 120 press-fit around the outer periphery of the stem 88. The second sleeve 120 includes a pair of shoulders 122 and 124 defining an axial groove 126 and a peripheral groove 128 therebetween. The sleeve 120 is adapted to slide within the axial extending portion 80 of the casing 76 and the bearing element 106.

The bearing element 106 includes an aperture 130 that in the off position is aligned with the axial groove 126 of the first sleeve 120. The locking device 118 is defined by a generally semi-circular wire having a first straight end 132 that in the locked position extends through an aperture 134 in the axially extending portion 80 of the casing 76, through the aperture 130 and into the groove or aperture 126. Due to the fit of the end 132 into the groove 126, the knob 30 cannot be rotated in this position.

To allow axial movement of the knob 30 and the stem assembly 86 from the locking to the first position and to prevent axial movement beyond the first position, the first sleeve 95C includes an arcuate groove 136 defined thereon. A second, looped end 138 of the locking member 118 extends through an aperture 140 in the extending portion 80 of the casing 76 and an aperture 142 in the bearing 106 into the arcuate groove 136. As a result, axial movement of the stem 88 causes axial movement of the second sleeve 120 relative to the end 132 of the locking element 118. The sleeve 120 may move the distance defined by the gap 144 (FIG. 5) defined between the first 95C and second 120 sleeves while the valve 10 is in the off position. This axial movement of the stem 88 moves the groove 126 relative to the end 132 positioning the end 132 within the annular groove 128 of the second sleeve 120.

Once the stem assembly 86 has been axially moved through the gap 144, the shoulder 124 abuts the first sleeve 95C and due to the engagement of the end 138 of the locking element 118 in the groove 136, further axial movement is prevented. This engagement of the first 95C and second 120 sleeves defines the first position of the valve 10. The knob 30 and the stem 88 may then be rotated and the end 132 will not hamper this rotation since it may move along the groove 128.

The first sleeve 95C and the drive washer 96 in the off and first positions of the valve 10 are coupled to the stem 88 through the interaction of the extensions 95A and 95B being positioned within the axial slots 92 defined on the stem 88. In this manner, the stem 88 may be moved axially from the locking position to the first position without imparting similar movement to the washer 95. This axial movement may then be followed by rotation of the knob 30 to select the desired flame height. Furthermore, in the locking and first positions of the valve 10, the drive yoke 96 and the drive plate 95 are coupled through the interaction of the extensions 110 in the aperture 112 and the slot 113.

Upon rotation of the knob 30 and the stem 88 in the first position, the drive washer 95 and the second sleeve 95C are rotated due to the coupling of the drive washer 95 to the stem 88. This rotation rotates the groove 136 relative to the end 138 of the locking element 118 moving the end 138 out of the groove 136 to a position engaging the outer peripheral surface of the second sleeve 95C. During this rotation, the flame height of the burner is selected.

Once the end 138 of locking element 118 has been moved out of the groove 136, the stem 88 may be further axially moved to the second position. This movement to the second position causes the second sleeve 95C to be moved due to the abutment with the first sleeve 120. This axial movement unlocks the drive washer 95 from the drive yoke 96 (FIG. 9) by moving the aperture 112 and the slot 113 away from the extensions 110.

In this second or final position, the knob 30 may again be rotated causing rotation of the drive washer 95 and the stem 46 thereby adjusting the thermostatically operated valve by varying the position of the lever 40. This latter rotation of the knob 30 selects the temperature of the burner. The knob 30 is prevented from being rotated more than one revolution by a tang 121 on the washer 95 that engages an abutment 123 defined on the inner periphery of the casing 76 upon completion of a full revolution.

Counter rotation of the knob 30 at the completion of the cooking cycle will reposition the ends 132 and 138 of the locking element 118 and in their respective slots again locking the knob 30.

To review the operation briefly, the valve handle 30 is continuously connected to the thermostatic valve 10 to effect temperature selection. It is normally clutched to the rotor valve disc 28 in order to rotate the valve disc. Ordinarily, the valve 10 will be in its off position at which time the radial boss 71 on the valve handle 30 is pointing toward the line 68.

To turn on the valve 10 the handle 30 is moved axially to move the end 132 of the locking element 118 out of the slot 126. Axial insertion is continued until the shoulder 124 of the sleeve 120 abuts against the leading edge of the second sleeve 95C thus preventing further axial movement. Once this occurs, the end 132 is positioned within the peripheral groove 128 of the sleeve 120 allowing rotation of the valve 30 in a clockwise direction to select the desired maximum flame height. In this position of the valve 10, gas will flow from the manifold through the inlet passage 16, the passage 72 in the rotor valve 28 and the passage 74 in the valve body 20 via the thermostatic valve 24 to the chamber 22 and thence through the outlet passage 58 and hood 56 to the burner.

Once this operation has been completed the handle 30 may be further pushed inwardly since the rotation to select the temperature height has rotated the end 138 of the locking element 118 out of the groove 136 thereby allowing further axial movement. This axial movement of the handle 30 declutches the drive washer 95 from the yoke 96 as illustrated in FIG. 9. The handle 30 is then rotated to rotate the shaft 46 and thereby set the desired temperature to be maintained by the valve. To return the valve 10 to the off position the valve handle 30 is moved in a counter clockwise direction.

While the present invention has been described in connection with an illustrative embodiment thereof, these details are not intended to be limitative of the invention except insofar as set forth in the accompanying claims.

What is claimed as new and desired to be secured by Letters Patent of the United States is:

1. A gas valve comprising:
   a valve body including an inlet adapted to be coupled to a source of gas and an outlet adapted to be coupled to a gas utilization device;
   a rotatable gas flow control element mounted in said body and between said inlet and outlet for controlling the flow of gas into said body;
   a thermostatically actuated valve coupled to said outlet for controlling the volume of gas flow therethrough;
   means for operating said thermostatically actuated valve to a selected temperature setting;
   means axially actuable from a first to a second position for rotating said control element to a preselected position thereby controlling said volume of gas flow and axially actuable to a third position for operating said temperature setting means;
   means for manually operating said actuable means; and
   a locking element including a first portion engaging said actuable means for preventing rotation of said actuable means in said first position and a second portion engaging said actuable means for preventing axial movement of said actuable means from said second to said third positions prior to rotation of said actuable means in said second position.

2. The gas valve claimed in claim 1 said second portion of said locking element having a generally looped configuration.

3. The gas valve claimed in claim 2 wherein said actuable means comprises a shaft including a grooved portion having a groove that in a first position engages said second portion of said locking element, said groove movable out of engagement with said second portion of said locking element upon rotation of said actuable means while in said second position.

4. The gas valve claimed in claim 1 wherein said actuable means comprises a shaft having a first engagable portion for engaging said first portion of said locking element, said first engageable portion including a slot, said first portion of said locking element being positioned in said slot, said first engageable portion being moved upon axial movement of said actuable means to said second position to a position wherein said slot is out of engagement with said first portion.

5. A gas valve for controlling the temperature and the height of a flame for a gas burner comprising:
   a valve body including a gas inlet and a gas outlet;
   a thermostatically actuated regulating valve mounted in said body to control gas flow through said body;
   a manually operable valve for controlling flame height mounted in said body in a position to control gas flow through said body, said manually operable valve including a rotor valve disc;
   setting means for rotating said rotor valve disc to a selected position to set said flame height and to actuate said regulating valve to a selected position; said setting means including a shaft rotatably and axially slideably mounted in said body, and a knob secured to said shaft, said shaft axially slideable to a first position to rotate said valve disc and axially slideable to a second position to actuate said regulating valve; and
   position control means for controlling the position of said setting means, said position control means comprising a retention member slideably coupled to said shaft to lock said shaft in the valve off position and rotatably coupled to said shaft to prevent axially sliding said shaft from said off position to said second position prior to rotation of said shaft in said first position.

6. The gas valve claimed in claim 5 further comprising a first sleeve secured to said shaft, said first sleeve including an axial groove, said position control means includes a first end extending through said body and into said axial groove in the valve off position thereby preventing rotation of said shaft, said groove being moved away from said first end upon axial sliding of said shaft to said first position whereupon said shaft may be rotated.

7. The gas valve claimed in claim 6 wherein said shaft also includes a second sleeve, said second sleeve includes an arcuate groove, said position control means includes a second end extending through said housing and into said arcuate groove in the valve off position, said arcuate groove being rotated away from said second end upon rotation of said shaft in said first position thereby allowing axial sliding of said shaft to said second position.

8. A thermostatic gas valve for controlling the flame height and temperature of a burner comprising:
   a valve housing including a gas inlet and a gas outlet;
   a rotor valve disc rotatably mounted within said housing for controlling gas flow from said inlet;
   a thermostatically controlled valve mounted in said housing for controlling gas flow from said valve disc to said outlet;
   a valve handle rotatable and slideably mounted in said housing for operating said valve disc and said thermostatically controlled valve;
   said valve handle including a shaft slideably and rotatably mounted in said housing and a stem rotatably mounted in said housing, said shaft including an elongated slot, said stem including a finger mounted in said slot thereby allowing axial movement of said shaft relative to said stem, said stem being coupled to said thermostatically controlled valve for actuation thereof;
   said shaft including a first sleeve mounted on said shaft, an axial groove defined in said first sleeve, said shaft including a second sleeve secured to said shaft, an arcuate groove defined in said second sleeve;
   clutch means for normally coupling said valve handle to said valve disc; and
   locking means for locking said thermostatic gas valve in an off position and for defining first and second positions corresponding to the positions of said valve handle for actuating said valve disc and said thermostatically controlled valve, said locking means comprising a lock element including first and second ends, said first end positioned in said axial groove and said second end positioned in said arcuate groove in said off position.

9. The valve claimed in claim 8 said second end of said lock element being of a looped configuration.

10. The valve element claimed in claim 8 wherein said first end of said lock element being secured to said housing thereby preventing movement of said end with said first sleeve upon axial movement of said first sleeve.

11. The valve claimed in claim 8 wherein said second end of said lock element being secured to said housing to prevent movement of said second end with said second sleeve upon rotation of said second sleeve.

* * * * *